(12) United States Patent
Wang et al.

(10) Patent No.: US 9,619,107 B2
(45) Date of Patent: Apr. 11, 2017

(54) METHODS AND SYSTEMS FOR DYNAMICALLY DISPLAYING ICONS ON A USER INTERFACE FOR SECURITY CHECK AND OTHER FUNCTIONS

(71) Applicant: TENCENT TECHNOLOGY (SHENZHEN) COMPANY LIMITED, Shenzhen (CN)

(72) Inventors: Jianchun Wang, Shenzhen (CN); Ningju Dou, Shenzhen (CN); Yi Zhao, Shenzhen (CN); Ximin Yu, Shenzhen (CN); Ye Zhang, Shenzhen (CN); Jun Xue, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 270 days.

(21) Appl. No.: 14/279,863

(22) Filed: May 16, 2014

(65) Prior Publication Data

US 2014/0337801 A1 Nov. 13, 2014

Related U.S. Application Data

(63) Continuation of application No. PCT/CN2013/089055, filed on Dec. 11, 2013.

(30) Foreign Application Priority Data

May 9, 2013 (CN) .......................... 2013 1 0169238

(51) Int. Cl.
*G06F 17/30* (2006.01)
*G06F 3/048* (2013.01)
(Continued)

(52) U.S. Cl.
CPC .......... *G06F 3/04817* (2013.01); *G06F 3/048* (2013.01); *G06F 3/0481* (2013.01); *G06F 3/0482* (2013.01); *G06F 17/30861* (2013.01)

(58) Field of Classification Search
CPC .......... G06F 3/04817; G06F 17/30861; G06F 3/048; G06F 3/0481; G06F 3/0482
See application file for complete search history.

(56) References Cited

U.S. PATENT DOCUMENTS 6,104,397 A * 8/2000 Ryan ................... G06F 3/04817
715/846
8,959,330 B2 * 2/2015 Dobronsky ....... G06F 17/30899
709/206

(Continued)

FOREIGN PATENT DOCUMENTS

CN 101360071 A 2/2009
CN 101582887 A 11/2009
(Continued)

OTHER PUBLICATIONS

The World Intellectual Property Organization (WIPO) International Search Report for PCT/CN2014/072258 May 20, 2014.
(Continued)

*Primary Examiner* — Kieu Vu
*Assistant Examiner* — Roberto Borja
(74) *Attorney, Agent, or Firm* — Anova Law Group, PLLC

(57) ABSTRACT

A method and system for displaying icons on a user interface of a smart device are disclosed. The method includes obtaining a webpage address and checking security of the webpage linked to the webpage address. Further, the method includes displaying a first icon at a pre-determined position, the first icon indicating that the security check is in progress; obtaining a speed for loading the webpage and a speed for the security check; and adjusting icons displayed at the pre- (Continued)

determined position based on the speed for loading the webpage and the speed for the security check. The method and system consistent with the present disclosure may improve the user experience of smartphone users.

19 Claims, 8 Drawing Sheets

(51) Int. Cl.
*G06F 3/0481* (2013.01)
*G06F 3/0482* (2013.01)

(56) References Cited

U.S. PATENT DOCUMENTS

| | | | | |
|---|---|---|---|---|
| 2002/0073058 A1* | 6/2002 | Kremer | ............ | G06F 17/30864 |
| 2004/0078564 A1* | 4/2004 | Abdulhayoglu | .. | G06F 17/30861 |
| | | | | 713/156 |
| 2009/0089176 A1* | 4/2009 | McCabe | ............... | G06Q 20/10 |
| | | | | 705/26.1 |
| 2009/0254618 A1 | 10/2009 | Arnold et al. | | |
| 2013/0291077 A1* | 10/2013 | Sato | .................... | H04L 63/0823 |
| | | | | 726/6 |
| 2014/0033080 A1* | 1/2014 | Tong | ......................... | G06F 8/38 |
| | | | | 715/760 |

FOREIGN PATENT DOCUMENTS

| | | | |
|---|---|---|---|
| CN | 102739653 | A | 10/2012 |
| CN | 102855253 | A | 1/2013 |
| CN | 102891874 | A | 1/2013 |
| CN | 102917049 | A | 2/2013 |
| CN | 103019659 | A | 4/2013 |
| CN | 2011156167 | A | 3/2014 |

OTHER PUBLICATIONS

The World Intellectual Property Organization (WIPO) International Search Report for PCT/CN2013/089055 Mar. 20, 2014.
State Intellectual Property Office of the P.R.C (SIPO), Office Action 1 for 201310169238.2, Jan. 4, 2017, 8 Pages.

* cited by examiner

METHODS AND SYSTEMS FOR DYNAMICALLY DISPLAYING ICONS ON A USER INTERFACE FOR SECURITY CHECK AND OTHER FUNCTIONS

CROSS-REFERENCES TO RELATED APPLICATIONS

Related Applications

This application is a continuation application of PCT Patent Application No. PCT/CN2013/089055, filed on Dec. 11, 2013, which is based upon and claims the benefit of priority from Chinese Patent Application No. 201310169238.2, filed on May 9, 2013, the entire contents of all of which are incorporated herein by reference.

FIELD OF THE INVENTION

The present disclosure relates to Internet technologies and, more particularly, to methods and systems for displaying icons on a user interface.

BACKGROUND

With the development of smartphones and other smart devices, more and more users browse the Internet using s smart device. Often a smart device, such as a smartphone, has limited screen display space. Therefore, when designing mobile webpages, it is desirable to provide more functionality to the user while maintaining the completeness of the webpage.

In one exemplary mobile webpage, the user interface may have two permanent icons on the left side of the webpage address field. The first of the two icons may be a "Favorite" icon, enabling a user to add a webpage into the "Favorite" folder. The second of the two icons may be a security icon indicating whether the webpage is secure. Because of the limited screen display space on a smartphone, however, displaying two icons may not be an efficient way to utilize the limited screen space.

The disclosed method and system are directed to solve one or more problems set forth above and other problems.

BRIEF SUMMARY OF THE DISCLOSURE

Embodiments consistent with the present disclosure provide a method, system, mobile device, or a server for displaying icons on a user interface. Embodiments consistent with the present disclosure use the screen display space efficiently.

One aspect of the present disclosure provides a method for displaying icons on a user interface of a smart device. The method includes obtaining a webpage address and checking security of the webpage linked to the webpage address. Further, the method includes displaying a first icon at a pre-determined position, the first icon indicating that the security check is in progress; obtaining a speed for loading the webpage and a speed for the security check; and adjusting icons displayed at the pre-determined position based on the speed for loading the webpage and the speed for the security check.

Another aspect of the present disclosure provides a system for displaying icons on a user interface of a smart device. The system includes a first obtaining module configured to obtain a webpage address and a security checking module configured to check security of the webpage linked to the webpage address. The system further includes an icon displaying module configured to display a first icon at a pre-determined position, the first icon indicating that the security check is in progress, a second obtaining module configured to obtain a speed for loading the webpage and a speed for the security check, and an icon adjustment module configured to adjust icons displayed at the pre-determined position based on the speed for loading the webpage and the speed for the security check.

Another aspect of the present disclosure provides a system for displaying icons on a user interface of a smart device. The system includes a first obtaining module configured to obtain a webpage address and a security checking module configured to check security of the webpage linked to the webpage address. The system further includes an icon displaying module configured to display a first icon at a pre-determined position, the first icon indicating that the security check is in progress, a second obtaining module configured to obtain a speed for loading the webpage and a speed for the security check, and an icon adjustment module configured to adjust icons displayed at the pre-determined position based on a user input.

Embodiments consistent with the present disclosure may receive a request to upload a webpage on a smart device, such as a smartphone; obtain the webpage's address; check whether the requested webpage is secure; and display a first icon at a pre-determined position on the user interface displaying the requested webpage. Embodiments consistent with the present disclosure may further compare the speed for loading the webpage onto the smartphone to the speed of the webpage security check; and adjust the icons displayed at the pre-determined position on the user interface based on the comparison results. Embodiments consistent with the present disclosure may therefore dynamically display multiple icons at one pre-determined position on a user interface, save the screen display space, and efficiently use the screen display space on a user interface.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, a mobile device and a smart device are used interchangeably to refer to any computing device that may communicate with another computing device. Exemplary smart devices may include laptop computers, smartphones, tablet computers, etc. Smart devices may also include MP3 player, MP4 players, e-book readers, etc. Further, in the present disclosure, terms such as "a first icon" and "a second icon" are used to distinguish the references to two objects. They do not imply sequence or limit the disclosure in any other way.

Figure 8:
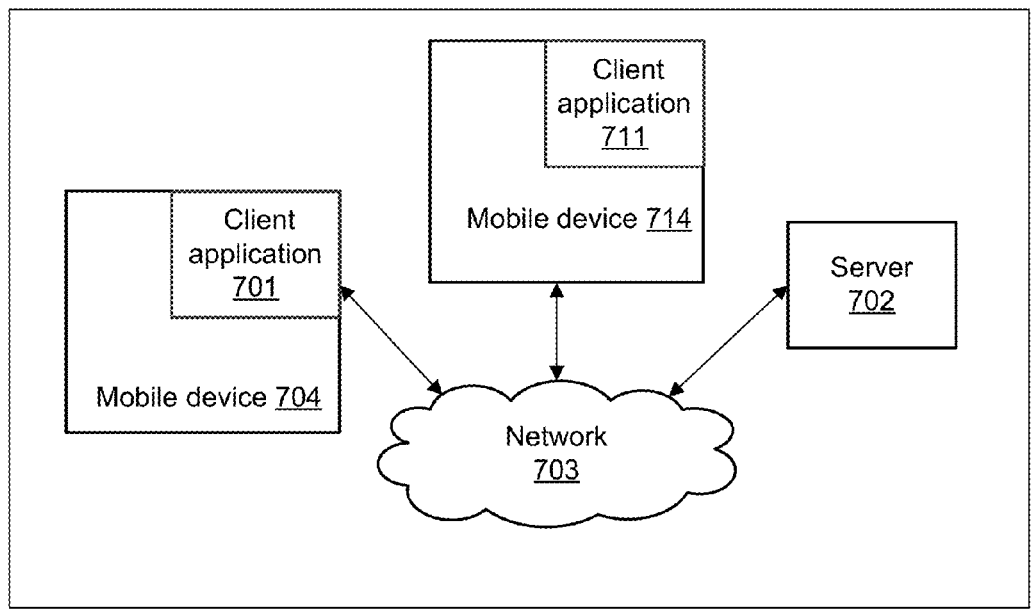
FIG. 8 illustrates an exemplary operating environment incorporating certain disclosed embodiments.

FIG. 8 illustrates an exemplary online computer environment 700 incorporating certain disclosed embodiments. As shown in FIG. 8, environment 700 may include mobile devices 704 and 714, a network 703, and a server 702. The network 703 may include any appropriate type of communication network for providing network connections to the mobile devices 704 and 714, and the server 702. For example, network 703 may include the Internet, LAN (Local Area Network), or other types of computer networks or telecommunication networks, either wired or wireless.

A server 702, as used herein, may refer to one or more server computers configured to provide certain functionalities, which may require any user accessing the services to authenticate to the server before the access. The server 702 may also include one or more processors to execute computer programs in parallel. The server 702 may include any appropriate server computers configured to provide certain server functionalities, such as storing or processing data related to displaying icons on a user interface. Although only one server is shown, any number of servers can be included. The server 702 may operate in a cloud or non-cloud computing environment.

Mobile devices 704 and 714 may include any appropriate type of network computing devices, such as PCs, tablet computers, smartphones, network TVs, etc. Mobile devices 704 and 714 may include one or more client applications 701 and 711. The client applications 701 and 711, as used herein, may include any appropriate software application, hardware application, or a combination thereof to achieve certain client functionalities, such as browsing a webpage online. For example, client applications 701 and 711 may be the Internet Explorer application, which may access websites and webpages. Any number of client applications 701 and 711 may be included in the environment 700.

Mobile devices 704/714 and server 702 may be implemented on any appropriate computing platform. FIG. 8 illustrates a block diagram of an exemplary computer system 800 capable of implementing mobile devices 704/714 and server 702.

Figure 9:
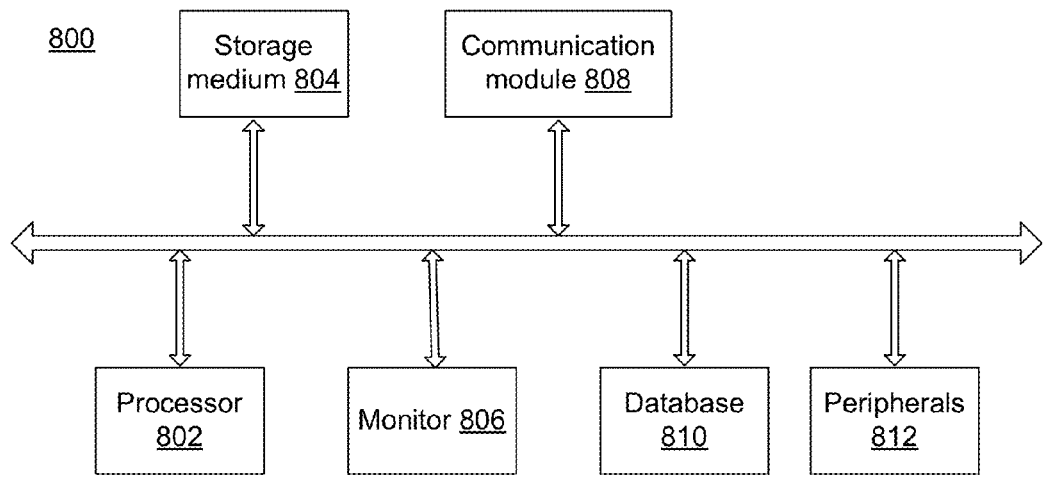
FIG. 9 illustrates a block diagram of an exemplary computer system consistent with the disclosed embodiments.

As shown in FIG. 9, computer system 800 may include a processor 802, storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as Read-only Memory (ROM), Random Access Memory (RAM), flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as a keyboard and a mouse. Communication module 808 may include network devices for establishing connections through the communication network 703. Database 810 may include one or more databases for storing certain data and for performing certain operations on the stored data, such as database searching.

In operation, the server 702 may obtain and process data related to displaying icons on user interfaces for mobile devices 704/714. For example, the server 702 may use processor 802 to check whether the content on a webpage is secure. If so, the processor 802 may send instructions to mobile devices 704/714 to display a "Secure" icon on a user interface.

Figure 1:
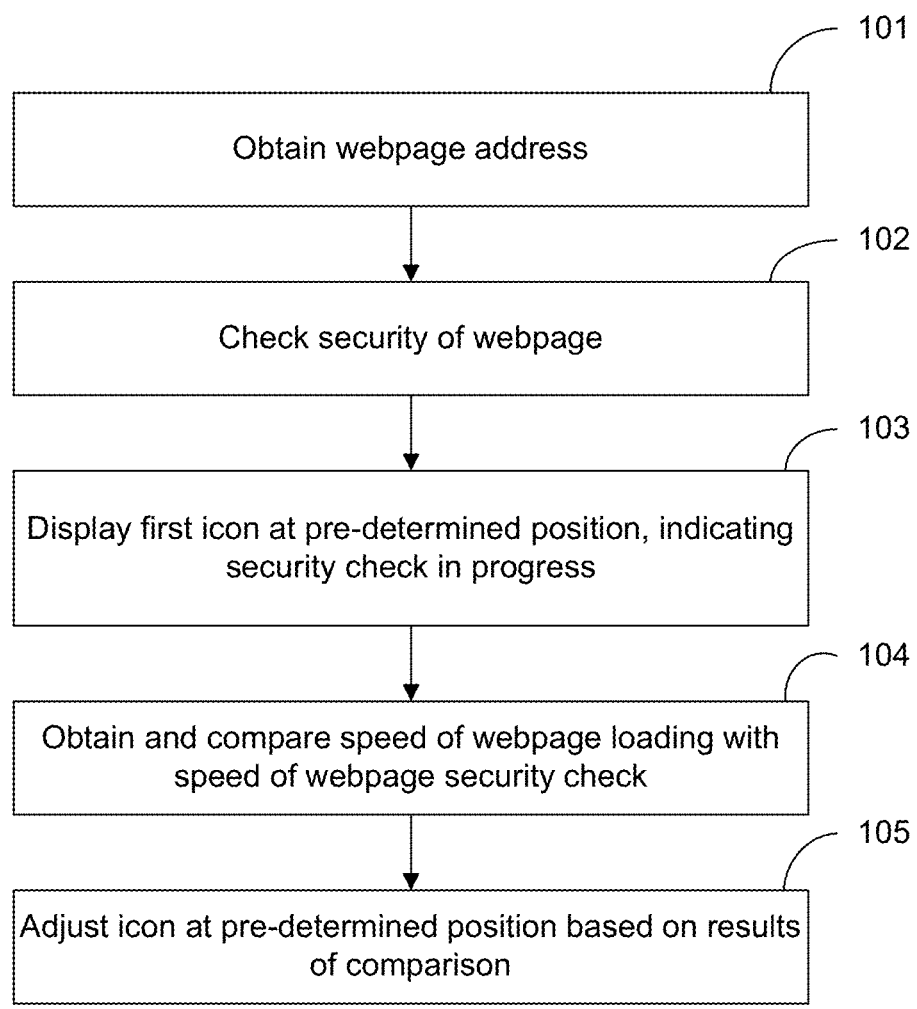
FIG. 1 is a flowchart of a method for displaying icons on a user interface implemented by an exemplary embodiment consistent with the present disclosure.

FIG. 1 shows a flow chart of a method for displaying icons on a user interface implemented by embodiments consistent with the present disclosure. The method shown in FIG. 1 includes steps 101-105. In step 101, the system for displaying icons on a user interface may receive a request to upload a webpage on a smart device, such as a smartphone. The system may obtain the address of the webpage. In step 102, the system may check whether the requested webpage is secure. In step 103, the system may display a first icon at a pre-determined position on the user interface displaying the requested webpage. The first icon may indicate that the system is in the process of checking the security of the webpage. In step 104, the system may compare the speed of the webpage download onto the smartphone to the speed of the webpage security check. In step 105, the system may adjust the icon displayed at the pre-determined position on the user interface based on the comparison results of step 104.

In embodiments consistent with the present disclosure, the step of checking the security of a webpage may include the following steps. First, a smartphone may send the address of the webpage to a server of the system for displaying icons on a user interface. The server may then check the security of the requested webpage. The smartphone may then receive the results of the security check from the server.

In embodiments consistent with the present disclosure, the step of adjusting the icon at the pre-determined position may include checking the speed of the security check and the speed of loading the webpage. If the security check is faster than the webpage's loading process, and the system for displaying icons on a user interface determines that the requested webpage is secure, then the system may change the color of the first icon (e.g., a security icon) for a first pre-determined time. Once the first pre-determined time passes, the system may replace the first icon with a second icon (e.g., a "Favorite" icon).

In embodiments consistent with the present disclosure, when the security check speed is slower than the webpage's loading speed, the system for displaying icons on a user interface may replace the first icon (e.g., a security icon) with a second icon (e.g., a "Favorite" icon). Once the system has completed the security check and determines that the webpage is secure, it may then replace the second icon with the first icon, and set the color of the first icon to a first color (e.g., green) for a second pre-determined time. Once the second pre-determined time passes, the system may then again replace the first icon with the second icon again. On the other hand, when the system for displaying icons on a user interface decides that the requested webpage is not secure, the system may replace the second icon with the first icon, and set the first icon to a second color (e.g., red).

In embodiments consistent with the present disclosure, the second icon may be a "Favorite" icon enabling a user to add webpages into the folder of favorites. The pre-determined position on the user interface may be a position next to the display of the webpage's address. The icons at the pre-determined position may indicate the status of the webpage displayed in the webpage address field.

Embodiments consistent with the present disclosure may receive a request to upload a webpage on a smart device, such as a smartphone; obtain the webpage's address; check whether the requested webpage is secure; and display a first icon at a pre-determined position on the user interface displaying the requested webpage. Embodiments consistent with the present disclosure may further compare the speed for loading the webpage onto the smartphone to the speed of the webpage security check; and adjust the icons displayed at the pre-determined position on the user interface based on the comparison results. Embodiments consistent with the present disclosure may therefore dynamically display multiple icons at one pre-determined position on a user interface, save the screen display space, and efficiently use the screen display space on a user interface.

Figure 2:
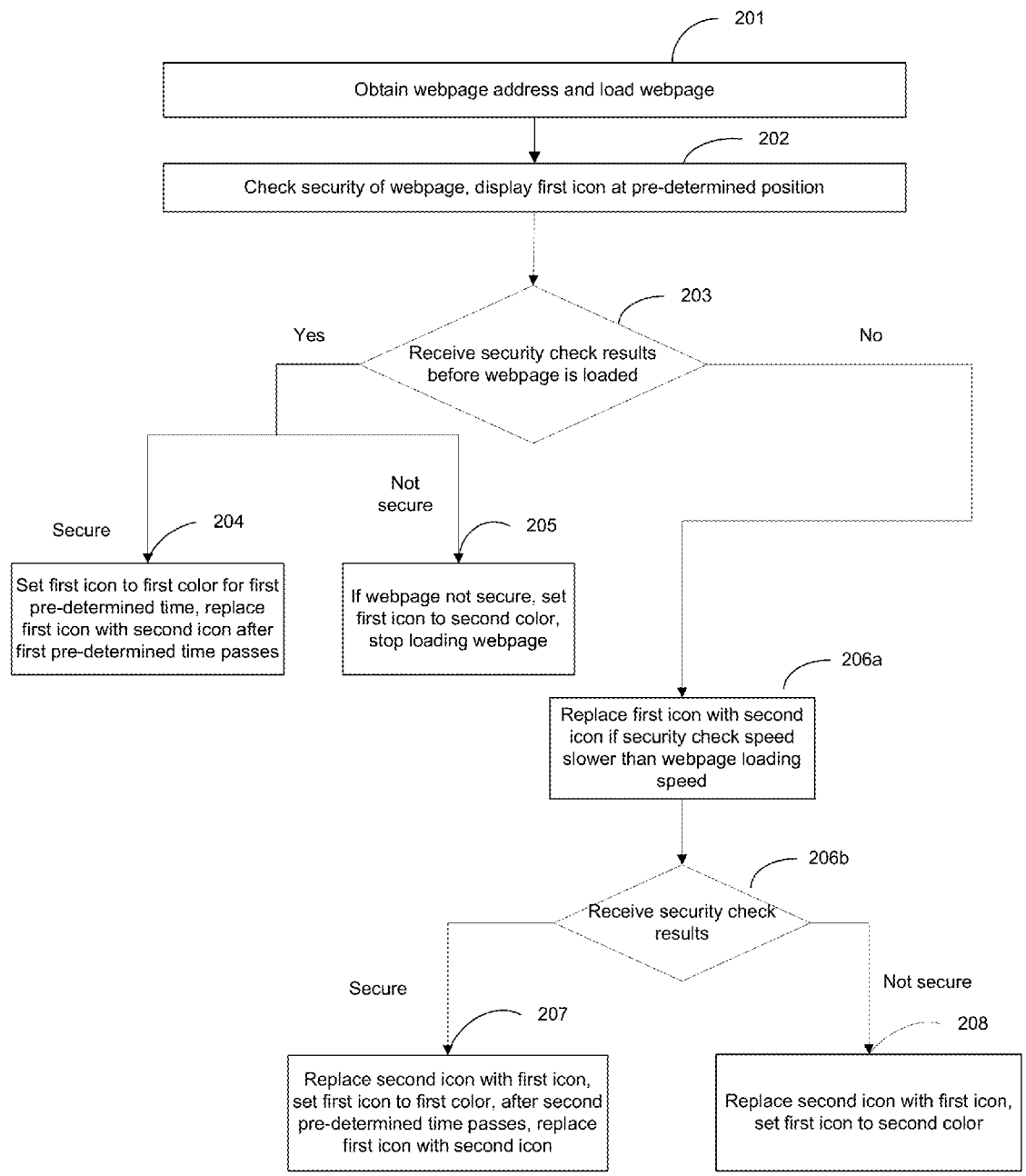
FIG. 2 is another flowchart of a method for displaying icons on a user interface implemented by an exemplary embodiment consistent with the present disclosure.

FIG. 2 shows another flow chart of a method for displaying icons on a user interface implemented by embodiments consistent with the present disclosure. The method shown in FIG. 2 includes steps 201-208. In step 201, the system for displaying icons on a user interface may receive a request to display a webpage from a smartphone. The system may obtain the address of the webpage, and load the requested page onto the smartphone. The requested webpage may be any webpage requested by a user. The user may provide the address by manually inputting it into a data field, or by activating (e.g., touching) a link to the webpage address.

In step 202, the system may check the security of the requested webpage, and display a first icon at a pre-determined position on the user interface. The system may monitor the smartphone. When the system detects that the smartphone has started to load a webpage, the system may check the security of the webpage. In this step, a smartphone may send the address of the webpage to a server of the system for displaying icons on a user interface. The server may then check the security of the requested webpage. The smartphone may then receive the results of the check from the server.

The system for displaying icons may include a database, which may store the addresses for secure webpages. When the system checks the security of the requested webpage, it may first check the database. If the requested webpage matches one of the secure webpages listed in the database, the system may determine that the requested webpage is secure. If not, the system may determine that the requested page is not secure.

In this step, the system may display a first icon at the pre-determined position of the user interface while checking the security of the webpage. The pre-determined position may include, but are not limited to, positions next to the data field of the webpage's address. The pre-determined position may be on the left side of the data field. The icons displaying at the pre-determined position may indicate the status of the security check. In addition, the system may display the first icon with a third color (e.g., gray) when the security check is in progress.

In step 203, before the webpage is loaded onto the smartphone, the system for display icons may receive the results of the security check. If the webpage is secure, then they system executes step 204. Otherwise, it executes step 205.

Embodiments consistent with the present disclosure may dynamically adjust the icons at the pre-determined position based on the speed of the security check and the speed of the webpage loading. The speed of loading the webpage onto the smartphone may be determined by the time consumed to load a part of or the whole webpage. The speed for the security check may be determined by the time consumed to check a part of or the complete content of the webpage.

In step 204, the system may set the color of the first icon to a first color. After a first pre-determined time passes, the system may replace the first icon with a second icon. When the system decides that the requested webpage is secure, it may set the first icon to the first color, such as green, to indicate that the page is secure. The first pre-determined time may be 2 seconds, 3 seconds, 4 seconds, etc. In this example, after the first pre-determined time passes, the system may replace the first icon with a second icon. An exemplary second icon may be, but is not limited to, a "Favorite" icon. When the second icon is activated, the smartphone may execute the corresponding functions, such as adding a webpage to the "Favorite" list.

In step 205, if the system for display icons on a user interface decides that the requested webpage is not secure, it may color the first icon with a second color, such as red, to warn the user that the webpage may not be secure. Optionally, the system may stop the smartphone from loading the unsafe webpage. The system may also allow the smartphone to load the rest of the webpage.

In step 206, the system for displaying icons may receive a message indicating that the webpage is fully loaded before it receives the results of the security check. The system may then replace the first icon with a second icon at the pre-determined position (206a).

In step 206b, the system for displaying icons on a user interface receives the security check results. In step 207, if the webpage is secure, then the system for displaying icons on a user interface executes step 208. If not, it executes step 209. In step 208, the system may replace the second icon with the first icon, and set the color of the first icon to a first color (e.g., green) for a second pre-determined time. Once the pre-determined time passes, the system may then again replace the first icon with the second icon. In step 209, the system may replace the second icon with the first icon, and set the color of the first icon to a second color (e.g., red).

In this example, steps 203-209, the system for displaying icons in a user interface may obtain the speed of the webpage loading and the speed of the security check. They system may then adjust the icons displayed at the pre-determined position of the user interface based on the speed of webpage loading and the speed of the security check.

Figure 3:
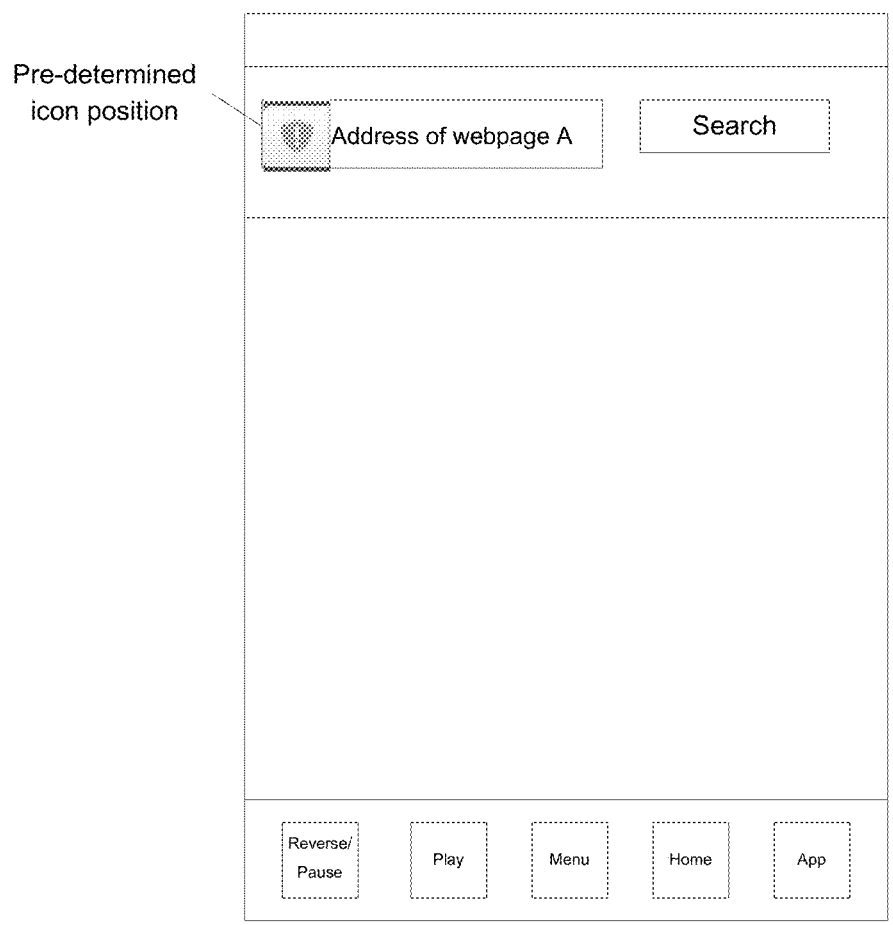
FIG. 3 is an exemplary user interface displaying icons on a webpage implemented by an embodiment consistent with the present disclosure.
Figure 4:
FIG. 4 is another exemplary user interface displaying icons on a webpage implemented by an embodiment consistent with the present disclosure.
Figure 5:
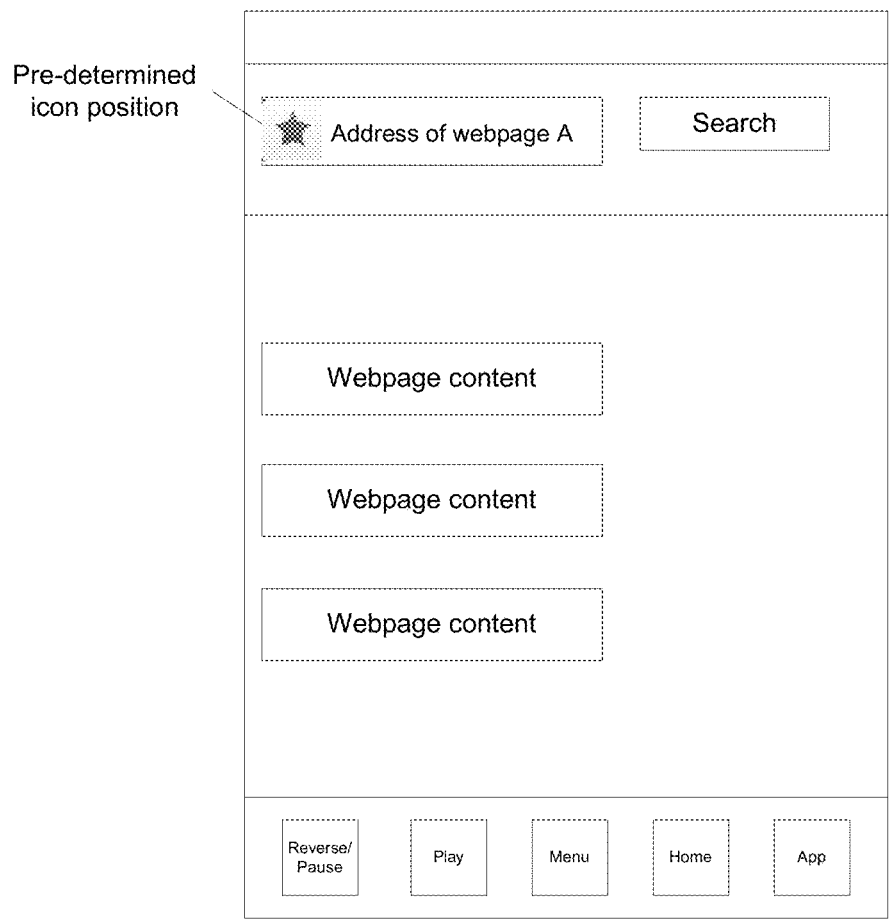
FIG. 5 is another exemplary user interface displaying icons on a webpage implemented by an embodiment consistent with the present disclosure.

FIG. 3 shows an exemplary user interface implemented by embodiments consistent with the present disclosure. In FIG. 3, a smartphone may load a webpage A. The system user interface may set a pre-determined position one the left side of the webpage address data field. The system for displaying icons on a user interface may then check the security of webpage A, and display a secure shield icon at the pre-determined position. If the system decides that the webpage A is not secure, it may set the secure shield icon to a selected color (e.g., red) to warn the user about the unsafe webpage. As shown in FIG. 4, in one embodiment, the system for displaying icons may display the type of risk related to the unsafe webpage on the user interface. If the system decides that the webpage is secure, it may set the secure shield icon to a selected color (e.g., green) for a pre-determined time. As shown in FIG. 5, after the secure shield icon is set to green for a pre-determined time, the system may replace the secure shield icon with a "Favorite" icon. When a user activates the "Favorite" icon, the smartphone may add webpage A into the "Favorite" list.

Embodiments consistent with the present disclosure may receive a request to upload a webpage on a smart device, such as a smartphone; obtain the webpage's address; check whether the requested webpage is secure; and display a first icon at a pre-determined position on the user interface displaying the requested webpage. Embodiments consistent with the present disclosure may further compare the speed for loading the webpage onto the smartphone to the speed of the webpage security check; and adjust the icons displayed at the pre-determined position on the user interface based on the comparison results. Embodiments consistent with the present disclosure may therefore dynamically display multiple icons at one pre-determined position on a user interface, save the screen display space, and efficiently use the screen display space on a user interface.

Figure 6:
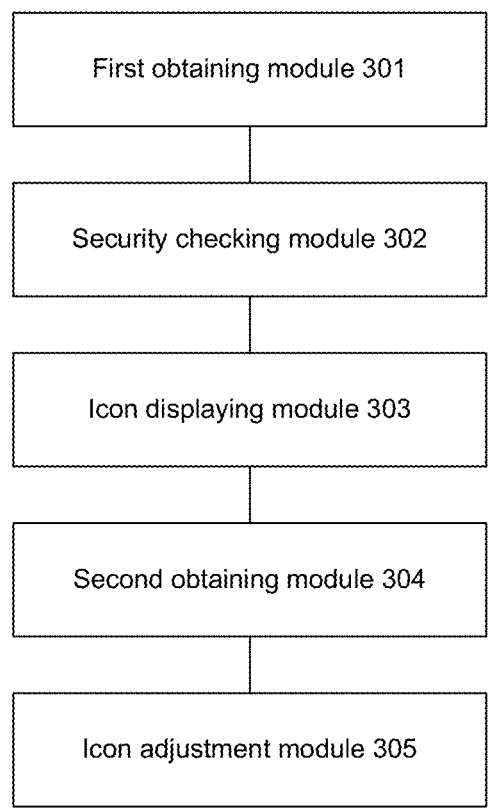
FIG. 6 is a schematic diagram of an exemplary system for displaying icons on a webpage consistent with the present disclosure.

FIG. 6 shows an exemplary schematic diagram of a system for displaying icons on a user interface. The system may be implemented on a smartphone. The system includes a first obtaining module 301, a security checking module 302, an icon displaying module 303, a second obtaining module 304, and an icon adjustment module 305. The first obtaining module 301 may obtain or receive the webpage address of the webpage requested by a smartphone user. The security checking module 302 may check the security of the requested webpage. The icon displaying module 303 may display a first icon at the pre-determined position on the user interface. The first icon may indicate that the security check is in progress. The second obtaining module 304 may obtain the speed of the webpage loading and the speed of the security check. The icon adjustment module 305 may dynamically adjust the icons at the pre-determined position based on the speed of the webpage loading and the speed of the security check.

In one embodiment, the security checking module 302 may include a sending unit sending a requested webpage address to a server. The server may then check the security of the webpage. The security checking module 302 may also include a receiving unit receiving security check results from the server.

Figure 7:
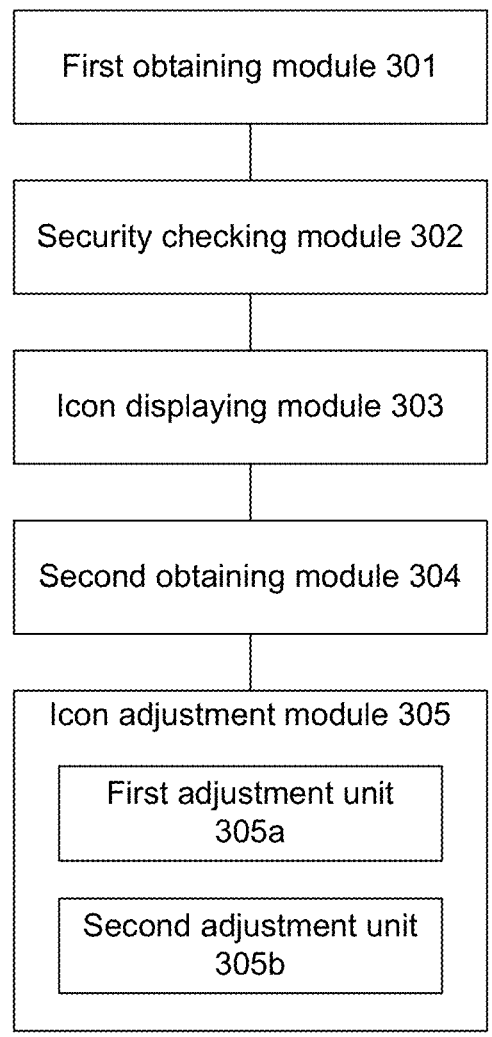
FIG. 7 is another schematic diagram of an exemplary system for displaying icons on a webpage consistent with the present disclosure.

In another embodiment, as shown in FIG. 7, the icon adjustment module 305 further includes a first adjustment unit 305a and a second adjustment unit 305b. The first adjustment unit 305a may change the color of the first icon to a first color when the security check speed is faster than the webpage loading speed and the webpage is secure. After the first icon is set to the first color for a first pre-determined time, the first adjustment unit 305a may replace the first icon with a second icon. In another embodiment, the first adjustment unit 305a may also set the first icon to a second color when the requested webpage is not secure. The first adjustment unit 305a may also stop the webpage from being loaded onto the smartphone.

In another embodiment, the second adjustment unit 305b may replace the first icon with a second icon when the security check is slower than the webpage loading speed. After the security check is completed and the webpage is proved to be secure, the second adjustment unit 305b may then replace the second icon with the first icon, and set the first icon to a first color for a second pre-determined time. After the second pre-determined time passes, the second adjustment unit 305b may again replace the first icon with the second icon.

In embodiments consistent with the present disclosure, when the system decides that the requested webpage is not secure, the second icon adjustment unit 305b may replace the second icon with the first icon, and set the first icon to a second color (e.g., red). Further, in embodiments consistent with the present disclosure, the second icon may be a "Favorite" icon enabling a user to add webpages into the folder of favorites. The pre-determined position on the user interface may be a position next to the display of the webpage's address. The icons at the pre-determined position may indicate the status of the webpage displayed in the webpage address field.

Embodiments consistent with the present disclosure may receive a request to upload a webpage on a smart device, such as a smartphone; obtain the webpage's address; check whether the requested webpage is secure; and display a first icon at a pre-determined position on the user interface displaying the requested webpage. Embodiments consistent with the present disclosure may further compare the speed for loading the webpage onto the smartphone to the speed of the webpage security check; and adjust the icons displayed at the pre-determined position on the user interface based on the comparison results. Embodiments consistent with the present disclosure may therefore dynamically display multiple icons at one pre-determined position on a user interface, save the screen display space, and efficiently use the screen display space on a user interface.

Consistent with embodiments of the present disclosure, one or more non-transitory storage medium storing a computer program are provided to implement the system and method for displaying icons on a user interface. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for displaying icons on a user interface may be implemented. For example, a smartphone may manage a plurality of icons and display them at pre-determined positions of a user interface. For example, a smartphone may display three icons at a pre-determined position of a user interface. Similar to the examples described above in relation to FIGS. 1-7, after the smartphone loads the webpage and displays the "Favorite" icon, it may switch to another icon, such as a "Home" icon or a "Tool" icon, after a pre-determine time (e.g., 5 seconds).

Alternatively, instead of switching to various icons based on pre-determined times, the smartphone may allow the user to toggle among multiple icons at the same pre-determined position. For example, if a user left-click on an icon, the user may activate the icon's functionality (e.g., adding to favorite pages, navigating to Home page); if the user right-click over an icon at the pre-determined position, the user interface may show the next available icon at the same position. As an example, a user can switch among "Home," "Favorite," or "Tools" icons at the same pre-determined position on the user interface.

By managing the icons on a user interface using embodiments of the present disclosure, a smart device may save screen display space and improve user experience of the smart device users.

What is claimed is:

1. A method for displaying icons on a user interface of a smart device, comprising:
   obtaining a webpage address;
   loading a webpage linked to the webpage address onto the smart device;
   when the smart device starts to load the webpage, checking security of the webpage linked to the webpage address;
   displaying a first icon at a pre-determined position, the first icon indicating that the security check is in progress, wherein the first icon is configured to indicate multiple states of the security check;
   obtaining a speed for loading the webpage onto the smart device and a speed for the security check; and
   adjusting icons displayed at the pre-determined position based on the speed for loading the webpage and the speed for the security check, including:
   if the smart device receives a result of the security check before the webpage is loaded, and the result indicates the webpage is secure,
      setting the first icon to a first color when the smart device receives the result of the security check; and
      automatically replacing the first icon with a second icon after displaying the first icon with the first color for a first pre-determined time, wherein activating the second icon leads the smart device to implement a function not related to the security check.

2. The method according to claim 1, wherein checking security of the webpage further comprises:
   sending the webpage address to a server, the server checking the security of the webpage; and
   receiving security check results from the server.

3. The method according to claim 1 the method further comprising:
   setting the first icon to a second color if the smart device receives the result of the security check before the webpage is loaded and the webpage is not secure; and
   stopping the webpage from loading onto the smart device.

4. The method according to claim 3, further comprising:
   displaying a type of risk related to the webpage on the user interface.

5. The method according to claim 1, the method further comprising:
   if the webpage is fully loaded onto the smart device before the smart device receives the result of the security check,
      automatically replacing the first icon with the second icon when the webpage is fully loaded; and
      when the smart device receives the result of the security check,
         automatically replacing the second icon with the first icon;
         setting the first icon to a first color if the webpage is secure; and
         automatically replacing the first icon with the second icon after displaying the first icon with the first color for a second pre-determined time.

6. The method according to claim 5, the method further comprising:
   setting the first icon to a second color if webpage is not secure.

7. The method according to claim 1, wherein the second icon is a "Favorite" icon.

8. The method according to claim 1, wherein the pre-determined position is set in relation to a position of the webpage address.

9. The method according to claim 1, wherein the first icon and the second icon indicate status of the webpage.

10. The method according to claim 1, wherein:
    the first icon is configured to indicate three states of the security check, including: the security check being in progress, the result of the security check being secure, and the result of the security check being not secure.

11. A system for displaying icons on a user interface of a smart device, comprising:
    a processor and a display screen, the processor being configured to:
    obtain a webpage address;
    load a webpage linked to the webpage address onto the smart device;
    when the smart device starts to load the webpage, check security of the webpage linked to the webpage address;
    display a first icon at a pre-determined position, the first icon indicating that the security check is in progress;
    obtain a speed for loading the webpage and a speed for the security check; and
    adjust icons displayed at the pre-determined position based on the speed for loading the webpage and the speed for the security check, including:
    if the smart device receives a result of the security check before the webpage is loaded, and the result indicates the webpage is secure,
       setting the first icon to a first color when the smart device receives the result of the security check; and automatically replacing the first icon with a second icon after displaying the first icon with the first color for a first pre-determined time, wherein activating the second icon leads the smart device to implement a function not related to the security check.

12. The system according to claim 11, wherein the processor is further configured to:
send the webpage address to a server, the sever checking the security of the webpage; and
receive security check results from the server.

13. The system according to claim 11, wherein the processor is further configured to set the first icon to a second color if the smart device receives the result of the security check before the webpage is loaded and the webpage is not secure and to stop the webpage from loading onto the smart device.

14. The system according to claim 11, wherein the processor is further configured:
if the webpage is fully loaded onto the smart device before the smart device receives the result of the security check,
to automatically replace the first icon with a second icon if the speed of the security check is slower than the speed of loading the webpage; and
when the smart device receives the result of the security check,
to automatically replace the second icon with the first icon when the security check is complete;
to set the first icon to a first color if the webpage is secure, and
to automatically replace the first icon with the second icon after the first icon is displayed with the first color for a second pre-determined time.

15. The system according to claim 14, wherein the processor is further configured to set the first icon to a second color if the webpage is not secure.

16. The system according to claim 11, wherein the second icon is a "Favorite" icon.

17. The system according to claim 11, wherein the pre-determined position is set in relation to a position of the webpage address.

18. A method for displaying icons on a user interface of a smart device, comprising:
obtaining a webpage address;
loading a webpage linked to the webpage address onto the smart device;
when the smart device starts to load the webpage, checking security of the webpage linked to the webpage address;
displaying a first icon at a pre-determined position, the first icon indicating that the security check is in progress, wherein the first icon is configured to indicate multiple states of the security check;
obtaining a speed for loading the webpage and a speed for the security check;
adjusting icons displayed at the pre-determined position based on the speed for loading the webpage and the speed for the security check, including:
if the smart device receives a result of the security check before the webpage is loaded, and the result indicates the webpage is secure,
setting the first icon to a first color when the smart device receives the result of the security check; and
automatically replacing the first icon with a second icon after displaying the first icon with the first color for a first pre-determined time, wherein activating the second icon leads the smart device to implement a function not related to the security check; and
adjusting the icons displayed at the pre-determined position based on a user input.

19. The method according to claim 18, wherein adjusting the icons displayed at the pre-determined position based on the user input further comprises:
toggling among multiple icons at the pre-determined position based on the user input, each of the multiple icons corresponding to a distinct function,
wherein when a user performs a preset action at the pre-determined position, the user interface displays a next available icon from the multiple icons.

* * * * *